United States Patent [19]

DeHaan et al.

[11] Patent Number: 4,743,327
[45] Date of Patent: May 10, 1988

[54] ADHESIVE BONDING OF FLUOROPOLYMERS

[75] Inventors: Abel DeHaan, Pembrook Pines; Richard D. Krug, Miami; Gyan S. Pande, Davie, all of Fla.

[73] Assignee: Cordis Corporation, Miami, Fla.

[21] Appl. No.: 889,289

[22] Filed: Jul. 22, 1986

Related U.S. Application Data

[63] Continuation of Ser. No. 621,105, Jun. 15, 1984, abandoned.

[51] Int. Cl.$^4$ .................. B05D 3/06; B29C 65/02; B29C 65/48; B29C 65/54
[52] U.S. Cl. .................. 156/272.6; 156/273.3; 156/275.7; 156/322; 204/169; 427/41; 427/255.6; 427/412.4
[58] Field of Search .................. 427/39–41, 427/255.6, 412.1, 412.4; 156/150.1, 272.2, 272.6, 272.8, 273.1, 273.5, 274.4, 274.8, 275.5, 275.7, 297, 299, 307.3, 307.5, 285, 273.3, 308.2, 322; 204/164, 165, 169; 250/324

[56] References Cited

U.S. PATENT DOCUMENTS

| | | | |
|---|---|---|---|
| 3,296,011 | 1/1967 | McBride et al. | 427/412.4 |
| 3,676,181 | 7/1972 | Kowalewski | 427/40 |
| 4,264,642 | 4/1981 | Ferralli | 427/255.6 |
| 4,365,587 | 12/1982 | Hirose et al. | 427/41 |
| 4,391,843 | 7/1983 | Kaganowicz | 427/40 |
| 4,465,715 | 8/1984 | Manabe et al. | 427/41 |
| 4,465,738 | 8/1984 | Chang | 422/41 |

OTHER PUBLICATIONS

Article, First Asian—Pacific Symposium, 1980, "Evaluation of Titanium, Carbon, Silver and Zinc as Cardiac Pacemaker Electrode Tip Materials", Hirshorn et al., vol. 3, p. 374.
Article, "Screening of Solid and Porous Materials for Pacemaker Electrodes", Jul.-Aug., 1981, Hirshorn et al., vol. 4, pp. 380–390.
Article, "Characterization of Pyrolytic Carbon Deposited on Graphite Substrates in Inductive R.F. Plasmas of Propylene and Argon", Inspektor et al., Apr., 1980 pp. 195–200.
Article, "Plasma Formed Polymers for Biomedical Application Part I. Synthesis and Fundamental Studies", Mayhan et al., May, 1975, pp. 1–12.
Article, "Polymerization of Organic Compounds in an Electrodeless Glow Discharge. IV. Hydrocarbons in a Closed System", vol. 19, 1975 pp. 531–543, Yasuda et al.
Article, "Glow Discharge Processes—Sputtering and Plasma Etching", Chapman, John Wiley & Sons, 1980, Chapter 7, pp. 297–299.

Primary Examiner—Merrell C. Cashion, Jr.
Attorney, Agent, or Firm—Lockwood, Alex, Fitzgibbon & Cummings

[57] ABSTRACT

A multi-layered article is provided wherein at least one of the layers is made of an inert material that strongly resists adherence of adhesives thereto. The inert substrate of the multi-layered article has a thin plasma deposited film thereon, and an adhesive layer bonds another substrate to this thin plasma deposited film.

5 Claims, 1 Drawing Sheet

U.S. Patent  May 10, 1988  4,743,327
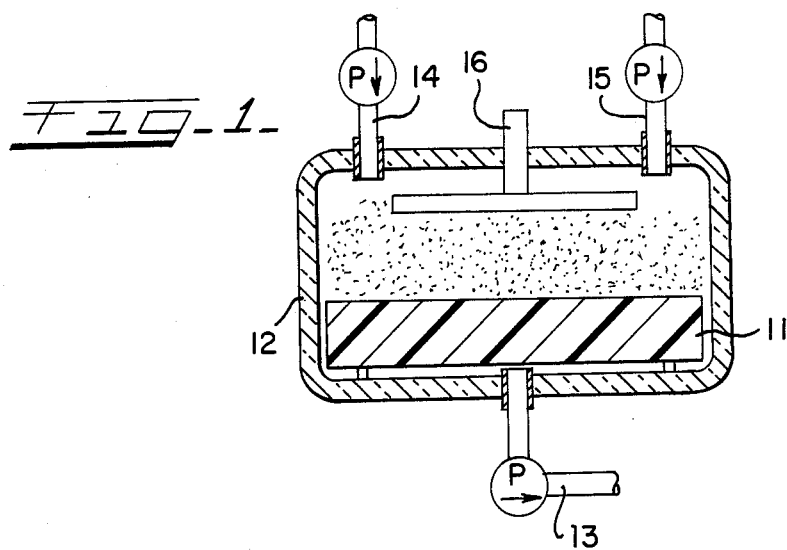
Fig-1-
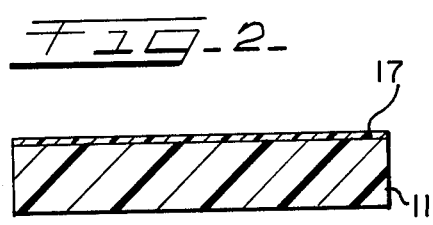
Fig-2-
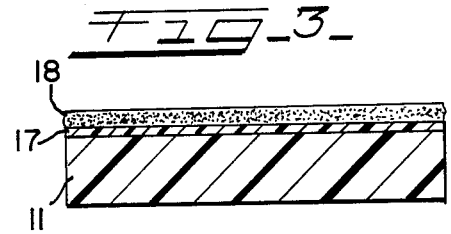
Fig-3-
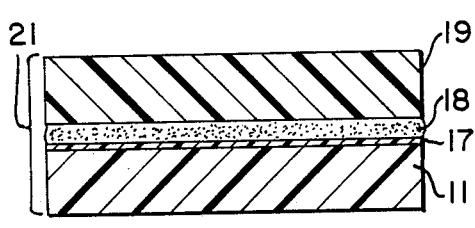
Fig-4-
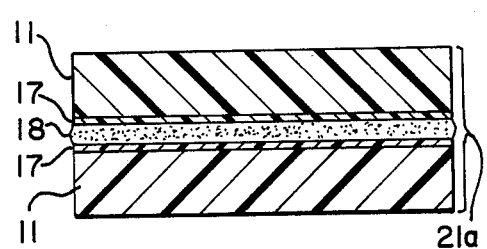
Fig-5-

ADHESIVE BONDING OF FLUOROPOLYMERS

This application is a continuation of application Ser. No. 621,105 filed June 15, 1984 now abandoned.

DESCRIPTION

This invention generally relates to the bonding of substrates together wherein at least one of the substrates is made of an inert material such as a fluoropolymer. More particularly, the invention includes a method and multi-layered substrate produced thereby wherein a thin plasma deposition layer or coating is adhered to a surface of a substrate that is made of an inert material such as a fluoropolymer, and an adhesive composition bonds the thin plasma deposited coating of the inert substrate to another substrate, either to one that is readily adhered to by that adhesive composition or to another similarly treated inert substrate.

The utilization of substrates having an inert surface made of a material such as fluoropolymers or the like, particularly polytetrafluoroethylene resins including Teflon, is an important part of certain industries and is especially important in the medical implant industry in connection with devices that have surfaces which must be chemically inert. Chemically inert surfaces are those which are extremely resistant to chemical interaction except under the most stringent of conditions. Many such inert surfaces are particularly useful because they effectively resist chemical interaction under conditions in which it is critical that the surface of the substrate will consistently maintain its integrity during use, such as in those situations where the surface is intended for contact with highly corrosive materials. Other situations include those where the material that contacts the inert surface cannot tolerate the presence of foreign materials such as where the inert surface contacts body tissue or fluids.

These same properties of chemical inertness present a substantial problem when it becomes necessary to rigidly affix such an inert substrate to a surface or to another substrate. Heretofore, the bonding of an inert substrate such as a fluoropolymer required an approach whereby the inert surface to be bonded is destructively treated by extremely harsh procedures, for example chemical etching with a powerful etchant such as sodium metal dissolved in tetrahydrofuran and naphthalene, which procedure removes a surface layer of the inert material and activates the inert surface.

By virtue of the present invention, it is possible to bond inert substrates while avoiding any destructive treatment thereof. The invention includes the step of plasma depositing a thin film onto the inert surface to be bonded, after which a suitable adhesive is applied to the thin plasma deposit, and the adhesive surface thus provided is contacted with the surface to which the inert substrate is to be bonded.

It is accordingly a general object of the present invention to provide an improved method of bonding an inert surface to another surface and the multi-layered article produced thereby.

Another object of this invention is to provide an improved method and article wherein an inert substrate is bonded to another substrate without having to destructively treat the inert substrate.

Another object of this invention is to provide an improved method and multi-layered article produced thereby wherein an intermediate plasma deposited layer is utilized.

Another object of this invention is to use plasma deposition techniques in conjunction with the bonding of surfaces, substrates or articles together.

Another object of this invention is to provide an improved method and multi-layered article produced thereby, which method is non-contaminating, does not use hazardous chemicals, and can be effectively used on irregularly shaped articles.

These and other objects of the present invention will be apparent from the following description of the invention, taken in conjunction with the accompanying drawings, wherein:

FIG. 1 is a generally schematic cross-sectional illustration of the formation of a plasma deposit onto an inert substrate;

FIG. 2 is a cross-sectional illustration of the plasma deposited substrate prepared in accordance with FIG. 1;

FIG. 3 is a cross-sectional illustration of the plasma deposited substrate of FIG. 2 having an adhesive layer applied thereover;

FIG. 4 is a cross-section of a multi-layered article prepared according to this invention; and FIG. 5 is a cross-sectional illustration of another multi-layered article prepared according to this invention.

A substrate 11 that is made of inert material is placed within a plasma depsoition environment such as the illustrated glow discharge reaction tube 12. Reaction tube 12 includes a vacuum pulling device 13 of known construction that is capable of imparting a low pressure condition to the interior of the reaction tube 12. Gas introducers 14 and 15 provide for entry of gases into the glow discharge reaction tube 12, and electrode assembly 16 applies low frequency RF energy to gases within the reaction tube 12.

Glow discharge reaction tube 12 illustrates a preferred type of apparatus that is suitable for proceeding with the plasma deposition aspects of this invention. A thin, plasma deposited coating or film 17 is adherently formed at a surface of the inert substrate 11 by virtue of such plasma deposition techniques. The thin plasma deposit film 17, generally shown in FIG. 2, can be as thin as a substantially monomolecular layer of a plasma deposited compound that is substantially less inert than the inert substrate 11 to which it is adhered.

With reference to FIG. 3, an adhesive layer 18 is applied over the thin plasma deposited coating or film 17. Adhesive layer 18 is composed of an adhesive composition that effectively adheres to the thin plasma deposited film 17, although same would not provide a suitable adhesive bond to the inert surface of the substrate 11 that is coated with the plasma film 17. While the adhesive layer 18 is still tacky or otherwise in a state at which it is capable of bonding, a substrate 19 is brought into contact therewith for bonding to the adhesive layer 18 by virtue of the adhesive properties thereof. The result is the formation of a multi-layered article 21 which, in effect, includes an adhesive bond of the inert substrate 11 to another substrate 19.

In the embodiment illustrated in FIG. 4, the substrate 19 of the multi-layered article 21 is made of a material that is readily and securely adhered to by the adhesive layer 18. FIG. 5 illustrates an embodiment wherein a plurality of inert substrates 11 are bonded to each other in order to form a multi-layered inert substrate article 21a.

With more particular reference to the process according to this invention, the thin film 17 is formed on the inert substrate 11 by a procedure that incorporates plasma deposition techniques. As used herein, the term plasma refers to a state that a gas achieves when it is excited to a point of ionization, which is the region in which an active species of the gas is actually formed. Preferred plasma deposition techniques include those of the glow discharge type wherein a gas is introduced into a vacuum environment in which the inert substrate 11 is situated, this gaseous environment having energy implemented thereinto when same is at a moderate temperature, typically at room temperature.

One or more hydrocarbons, with or without inert gases, provide the gaseous environment within the reaction chamber 12. Inert gases include argon, helium, neon or the like, the preferred inert gas being argon. Suitable hydrocarbons include those having not more than about six carbon atoms having one or more double bonds including alkenes such as ethylene, propylene, butylene or the like, hydrocarbons having triple bonds such as acetylene, and saturated hydrocarbons such as ethane, propane or the like. Alkenes are preferred.

The RF energy imparted to the hydrocarbon within the reaction chamber 12 accomplishes what is known as a "plasma deposition polymerization", which does not necessarily result in the formation of a high molecular weight polymer. The term plasma deposition polymerization is understood to refer to a phenomenon wherein the hydrocarbon molecules leave their vapor phase because of an increase in molecular weight and/or a fixation of the hydrocarbon molecules onto the inert substrate 11. This plasma deposition polymerization transforms the vapor phase hydrocarbon molecules into a solid hydrocarbon deposit on the surface of the inert substrate 11. This plasma deposition polymerization provides a surface that has a surface polarity different from that of the inert substrate 11.

Preferably, the thin plasma deposited coating or film 17 is laid down to be as thin as a substantially monomolecular layer in order to enhance the adherence between the thin film 17 and the inert substrate 11. While not being bound by any theory or mechanism, it is believed that this adherence between the thin film 17 and the substrate 11 includes forces of attraction known as van der Waals forces that are instrumental in enhancing the effectiveness of this adherence since these forces are acting on a generally molecular level, rather than on a gross level, which would be the case if the hydrocarbon were polymerized in a more conventional manner other than that of plasma deposition. It is further believed that the plasma atmosphere displaces halogen atoms such as fluorine from the inert fluorocarbon substrate which results in the formation of carbon-to-carbon double bonds between the inert substrate and the plasma deposit and that the van der Waals forces are instrumental in forming such double bonds.

Typically, the plasma depositing environment will be of the glow discharge type within a reaction chamber within which extremely low pressure vacuum conditions are developed in accordance with known procedures for plasma deposition techniques. Energy may be implemented thereinto by an energy imparting method and structure such as the illustrated plate electrode assembly 16 for imparting an RF discharge or microwave signals. Gas within the environment is activated by the energy source to such an extent that the hydrocarbon gas glows as the energy is supplied thereto under vacuum conditions and undergoes the plasma deposition "polymerization" previously discussed herein. The thinness of the plasma deposited coating or film 17 thus formed is primarily affected by the length of time that the inert substrate 11 is kept within the plasma deposition environment.

The plasma deposition procedure may include one or more pretreatment steps, whereby the inert substrate 11 is first pretreated. Such pretreatment is typically within the reaction chamber or tube 12. This pretreatment may be in the nature of a plasma cleaning, etching or the like with an inert gas plasma such as argon, helium or neon. Similar post-treatment procedures may also be practiced.

In the preferred sequence of steps, the inert substrate, which is typically a fluoropolymer that is fluorine containing or fluorine and chlorine containing such as tetrafluoroethylene or fluorinated ethylenepropylene, is treated with an inert gas glow discharge plasma, typically argon, in order to prepare and clean the inert substrate surface. Such inert gas pretreatment can be carried out, for example, by flowing the inert gas through the gas introducer 14. The thus cleaned surface is then submitted to a hydrocarbon plasma of a monomer such as propylene or ethylene in order to carry out the plasma deposition polymerization that forms the thin plasma deposited coating or film 17. The gas hydrocarbon may, for example, enter the reaction chamber or tube 12 through the gas introducer 15. Such plasma deposition polymer or thin film 17 may then be subjected to a post-treatment inert gas plasma, for example, by again flowing argon gas through the gas introducer 14 in order to thereby further prepare same for bonding by the adhesive.

Each pretreatment, treatment and post-treatment plasma deposition step may be completed before the next step is begun. Alternatively, the inert gas may be continuously blended out of the plasma within the reaction chamber while the hydrocarbon homopolymer gas is blended into the plasma, and the hydrocarbon monomer gas may be continuously blended out of the plasma while the post-treatment inert gas is blended into the plasma such that the pretreatment procedure is continuously and gradually modified into a depositing procedure which is then continuously and gradually modified into the post-treatment procedure.

With more particular reference to the adhesive layer 18, same should be of a composition that is suited for adhering the plasma deposition polymer 17 to the other substrate which may be a metal, resin, polymer or the like. Exemplary adhesives include those of the epoxy type or of the polyurethane type, for example.

It will be understood that the embodiments of the present invention which have been described are merely illustrative of a few of the applications of the principals of the present invention. Numerous modifications may be made by those skilled in the art without departing from the true spirit and scope of the invention.

We claim:
1. A method for forming a multi-layered medical article having a substrate with a chemically inert surface, comprising:
   inserting a medical substrate having an inert fluoropolymer surface into a glow discharge reaction chamber;
   developing low pressure vacuum conditions within said glow dishcarge reaction chamber;

pretreating the inert fluoropolymer surface in said reaction chamber and under said low pressure vacuum conditions with an inert gas glow discharge plasma to form a pretreated surface, said inert gas being selected from the group consisting of argon, helium and neon;

thereafter subjecting a hydrocarbon monomer to low pressure glow discharge plasma deposition conditions by flowing a hydrocarbon monomer into and by applying energy within the reaction chamber under said low pressure vacuum conditions and adherently forming a thin plasma deposited hydrocarbon film onto the pretreated surface of the substrate, said adherent thin plasma deposited film including the hydrocarbon subjected to plasma deposition conditions, said step of adherently forming the thin plasma deposited film includes posttreating the plasma deposited polymer with an inert gas glow dishcarge plasma;

applying an adhesive layer onto the thin plasma deposited film; and contacting another substrate with the adhesive layer in order to form the multi-layered medical article wherein the inert fluoropolymer surface of the substrate is bonded to said another substrate through the thin plasma deposited hydrocarbon film and the adhesive layer.

2. The method according to claim 1, wherein said step of adherently forming the film deposits a film which can be as thin as a substantially monomolecular layer of the hydrocarbon.

3. The method according to claim 1, wherein the adhesive layer of the applying step is adherent to the another substrate and to the thin plasma deposited film and is non-adherent to the inert fluoropolymer surface.

4. The method according to claim 1, wherein said step of adherently forming the thin plasma deposited film includes incorporating an inert gas into the reaction chamber.

5. The method according to claim 1, wherein the hydrocarbon monomer has not more than about six carbon atoms and is selected from the group consisting of an alkene, a hydrocarbon having a triple bond, and a saturated hydrocarbon.

* * * * *